Patented Mar. 20, 1934

1,951,686

UNITED STATES PATENT OFFICE 1,951,686

NEW PROCESS OF PREPARING ARYLACETIC ACIDS AND NEW PRODUCT OBTAINABLE THEREBY

Arthur Wolfram, Frankfort-on-the-Main-Rodelheim, Ludwig Schörnig, Frankfort-on-the-Main-Hochst, and Emil Hausdörfer, Hofheim-in-Taunus, Germany, assignors to General Aniline Works, Inc., New York, N. Y., a corporation of Delaware No Drawing. Application January 21, 1930, Serial No. 422,482. In Germany February 1, 1929

9 Claims. (Cl. 260—108)

The present invention relates to a new process of preparing arylacetic acid and to new products obtainable thereby.

We have found that mono-halogen- or dihalogen-acetic acids and their esters, react with the aromatic hydrocarbons of the naphthalene, acenaphthene, anthracene and fluorene series and their halogen and hydroxy derivatives with the formation of arylacetic acids if the reaction is carried out at a raised temperature.

This novel reaction is of great technical importance since it makes it possible to produce in a simple manner arylacetic acids which hitherto have been hardly accessible. The compounds obtainable can be used for the manufacture of dyestuffs, auxiliary products for dyeing and pharmaceutical products.

The following examples serve to illustrate our invention but they are not intended to limit it thereto, the parts being by weight:

*Example (1)*—50 parts of naphthalene are mixed with 100 parts of monochloracetic acid and the mixture is heated to 165° C., while stirring, whereby hydrochloric acid is evolved. In the course of about 24 hours the temperature is raised to 180° C. and kept for 48 hours between 180° C. and 185° C. After cooling, the dark mass is poured into water in order to remove the excess of chloracetic acid, filtered by suction and the residue is repeatedly treated with a caustic soda solution of 3 per cent. strength. The alkaline solution after being filtered is acidified, whereupon the α-naphthyl-acetic acid is precipitated in the form of a light-grey substance. It has the following formula:

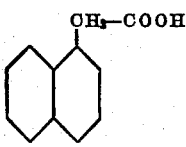

After recrystallization from water the acid melts at 129° C.

*Example (2)*—200 parts of acenaphthene are mixed with 250 parts of monochloracetic acid and the mixture is heated for 60 hours to 175° C. while stirring. After cooling, the mass is triturated in cold water, filtered by suction and the residue is extracted with a caustic soda solution of about 3 per cent. strength. From the alkaline solution, after it has been filtered, the acenaphthylacetic acid is precipitated by an excess of dilute mineral acid in the form of a grey-brown substance. It has the following formula:

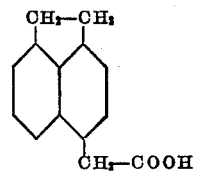

The product may also be worked up by drying the residue, after extraction with water, and then extracting it with ether. After evaporation of the ether, the acid is recrystallized from methyl alcohol or distilled in a vacuum; it passes over at about 180° C. under a pressure of 9 mm. The acenaphthyl-5-acetic acid crystallizes in colorless prisms and melts at 187° C. after it has sintered. Besides this acenaphthyl-5-acetic acid obtained as main-product there is furthermore produced a small quantity of an isomeric acid of a lower melting point.

*Example (3)*—100 parts of anthracene and 200 parts of monochlor-acetic acid are heated for about 24 hours to 175° C. which causes a lively evolution of hydrochloric acid. After cooling, the product is worked up as described in Examples 1 and 2. The crude acid thus obtained is purified by being precipitated from benzene by means of petroleum ether. The anthracyl monoacetic acid is obtained in the form of faintly yellowish coarse prisms melting at 189° C. It has the following formula

wherein the position of the $CH_2$—COOH could not yet be ascertained definitely.

*Example (4)*—200 parts of fluorene and 300 parts of monochloracetic acid are heated for about 60 hours to 175°–180° C. After cooling, the excess of monochloracetic acid is eliminated, as indicated in the preceding examples, by treating it with water and the fluorenyl-acetic acid is separated from the unattacked fluorene by extracting it with caustic soda solution of about 3 per cent. strength and precipitating with diluted hydrochloric acid.

The whole of the reaction mixture may also be distilled in a vacuum, in which case there distils first chloracetic acid, then fluorene and, finally, under a pressure of 8 mm. and at a temperature of between 160° C. and 180° C., fluorenylacetic acid. The fluorenylacetic acid crystallizes from methyl alcohol in the form of colorless prisms and melts at 148° C. after it has sintered. It has the following formula:

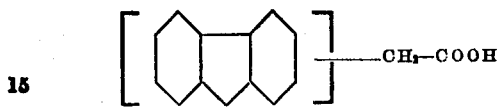

wherein the position of the CH$_2$—COOH could not yet be ascertained definitely.

*Example (5).*—If instead of the monochloracetic acid prescribed in Example 1, the monobromacetic acid is used and the temperature is raised to about 150° C. reaction occurs with evolution of hydrobromic acid. The product is worked up as described in Example 1. The final product thus obtained is the same as that obtained according to Example 1, namely the α-naphthylacetic acid. It has the following formula:

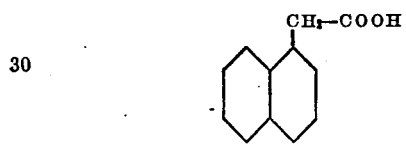

*Example (6).*—500 parts of α-bromonaphthalene and 235 parts of chloracetic acid are heated together for 150 hours to 160° C. The dark product is extracted with a dilute solution of sodium carbonate and the bromonaphthaleneacetic acid is separated from the filtrate by addition of dilute hydrochloric acid. The brownish, sticky crude product is recrystallized from water and then melts between 122° C. and 128° C. It has the following formula:

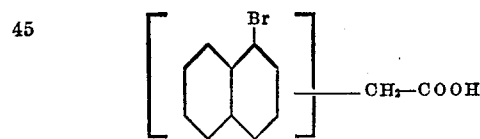

wherein the position of the CH$_2$—COOH could not yet be ascertained definitely.

*Example (7).*—418 parts of α-chloronaphthalene and 282 parts of chloracetic acid are heated together for 140 hours to gentle boiling. The dark product is extracted with 15000 parts of boiling water and sodium carbonate. The turbid alkaline solution is clarified by means of 200 parts of sodium sulfate and the filtrate is rendered acid. The crude chloronaphthylacetic acid separates in the form of a greyish-brown, granular powder which melts at 102° C.–105° C.; when recrystallized from water it forms colorless crystals of melting point 124° C. It has the following formula:

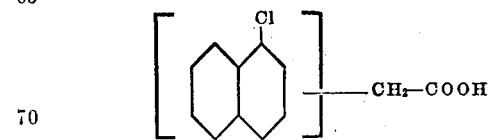

wherein the position of the CH$_2$—COOH could not yet be ascertained definitely.

*Example (8).*—256 parts of naphthalene and 244 parts of chloracetic ester are heated together for 72 hours to gentle boiling, the unchanged ester and naphthalene are then distilled during which operation the temperature rises to 225° C. The brown residue is heated for 2 hours in a reflux apparatus with 200 parts of methyl alcohol and 20 parts of concentrated caustic soda solution. The mass is diluted with water and cooled, the separated naphthalene is filtered and the alkaline filtrate is acidified. The precipitated naphthylacetic acid is taken up in ether. After the ether has been distilled, the naphthylacetic acid remains in the form of a brownish mass of melting point 108° C.–110° C. which rises to 129° C.–130° C. after the mass has been recrystallized from water. The new product has the following formula:

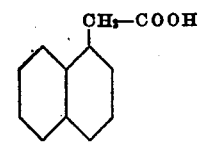

*Example (9).*—100 parts of β-naphthol and 200 parts of monochloracetic acid are heated together for 60–100 hours to 120° C. After the reaction is complete, the dark product is distilled in a vacuum whereby at first unchanged chloracetic acid and β-naphthol are obtained and subsequently, at 275° C. and under a pressure of 13 mm. the chief fraction distils in the form of a colorless product which is insoluble in alkalies. By recrystallization from ethyl alcohol or glacial acetic acid, the lactone of the 2-oxy-1-naphthylacetic acid is obtained in the form of colorless laminæ of melting point 106° C.–107° C.; this has been described in literature (cf. R. Stoermer "Annalen der Chemie", volume 313, page 92) as a product of melting point 104° C. The new product has the following formula:

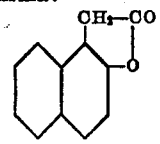

*Example (10).*—45 parts of naphthalene are heated with 50 parts of dichloracetic acid for about 60–100 hours up to 160° C.–180° C. After cooling, the dark mass thus obtained is treated with water in order to remove the excess of dichloracetic acid, introduced into dilute caustic soda solution and any naphthalene still present is distilled by means of steam. When the residual alkaline liquor is acidified, an almost colorless acid is obtained. When the product is recrystallized from ethyl alcohol, a dinaphthylacetic acid is obtained in the form of small colorless crystals of melting point 216° C–218° C. It has the following formula:

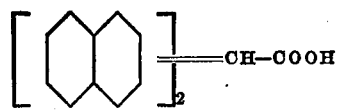

wherein the position of the CH—COOH could not yet be ascertained definitely.

We claim:

1. The process which comprises causing a compound of the group consisting of the mono-halogen and dihalogen acetic acids and their esters to react with a compound of the group consisting of the hydrocarbons of the naphthalene, acenaphthene, anthracene and fluorene series and their halogen and hydroxy derivatives at a temperature of about 100° C. to about 250° C.

2. The process which comprises causing a compound of the group consisting of the mono-halogen acetic acids and their esters to react with a compound of the group consisting of the hydrocarbons of the naphthalene, acenaphthene, anthracene and fluorene series and their halogen and hydroxy derivatives at a temperature of about 100° C. to about 250° C.

3. The process which comprises causing a compound of the group consisting of mono-halogen and dihalogen acetic acids and their esters to react with an aromatic hydrocarbon of the group consisting of the naphthalene, acenaphthene, anthracene and fluorene series at a temperature of about 100° C. to about 250° C.

4. The process which comprises causing a compound of the group consisting of mono-halogen acetic acids and their esters to react with an aromatic hydrocarbon of the group consisting of the naphthalene, acenaphthene, anthracene and fluorene series at a temperature of about 100° C. to about 250° C.

5. The process which comprises causing mono-halogen acetic acid to react with α-chlornaphthalene at a gentle boiling temperature.

6. The compounds substantially identical with those obtainable by the process which comprises heating at a temperature of about 100° C. to about 250° C. a compound of the group consisting of the monohalogen and dihalogen acetic acids with a compound of the group consisting of acenaphthene, anthracene and monochloronaphthalene.

7. The compound of the following probable formula:

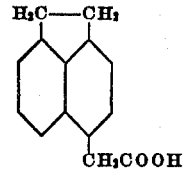

crystallizing in colorless prisms melting at 187° C. after it has sintered.

8. The compound of the following formula:

forming faintly yellowish coarse prisms melting at 189° C.

9. The compound of the following formula:

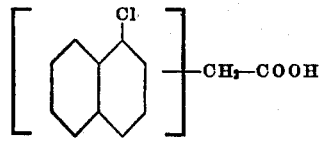

the said compound forming, when recrystallized from water, colorless crystals of melting point 124° C.

ARTHUR WOLFRAM.
LUDWIG SCHÖRNIG.
EMIL HAUSDÖRFER.